US010875466B2

(12) United States Patent
Sawada et al.

(10) Patent No.: US 10,875,466 B2
(45) Date of Patent: Dec. 29, 2020

(54) VEHICLE IMAGING UNIT

(71) Applicant: HONDA MOTOR CO., LTD., Tokyo (JP)

(72) Inventors: Makoto Sawada, Wako (JP); Masayoshi Takori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/537,687

(22) Filed: Aug. 12, 2019

(65) Prior Publication Data

US 2020/0070737 A1 Mar. 5, 2020

(30) Foreign Application Priority Data

Aug. 28, 2018 (JP) .................................. 2018-159708

(51) Int. Cl.
*B60R 11/02* (2006.01)
*B60R 1/00* (2006.01)
*B60R 11/04* (2006.01)

(52) U.S. Cl.
CPC ............ *B60R 11/0235* (2013.01); *B60R 1/00* (2013.01); *B60R 11/04* (2013.01); *B60R 2300/106* (2013.01); *B60R 2300/802* (2013.01); *B60R 2300/8046* (2013.01)

(58) Field of Classification Search
CPC ....... B60R 11/0235; B60R 1/00; B60R 11/04; B60R 2300/06; B60R 2300/802; B60R 2300/8046
USPC ....................................................... 348/148
See application file for complete search history.

(56) References Cited

U.S. PATENT DOCUMENTS

2004/0218041 A1\* 11/2004 Yagi .......................... B60R 1/12
348/148
2012/0314075 A1 12/2012 Cho
2013/0155236 A1\* 6/2013 Ramdeo .................... B60R 1/00
348/148

FOREIGN PATENT DOCUMENTS

| CN | 104520148 | 4/2015 |
|---|---|---|
| CN | 105599684 | 5/2016 |
| CN | 106828341 | 6/2017 |
| CN | 206926582 | 1/2018 |
| JP | 2013-520363 | 6/2013 |
| KR | 10-2015-0033092 | 4/2015 |

OTHER PUBLICATIONS

Chinese Office Action for Chinese Patent Application No. 201910738771.3 dated Sep. 29, 2020.

\* cited by examiner

*Primary Examiner* — Matthew K Kwan
(74) *Attorney, Agent, or Firm* — Amin, Turocy & Watson, LLP

(57) ABSTRACT

A vehicle imaging unit includes an imaging apparatus, a housing, and a lamp body unit. The imaging apparatus images a side rear direction of a vehicle. The housing houses the imaging apparatus and is attached to a side part of a vehicle body. The lamp body unit is attached to an outer part in a vehicle width direction of the housing and emits light to the outside. A lens arrangement part that exposes an imaging lens of the imaging apparatus to the outside is provided at an outer part in the vehicle width direction of a rear surface of the housing. A notch part at which the lamp body unit is arranged is provided on an outer wall in the vehicle width direction of the housing.

4 Claims, 10 Drawing Sheets

VEHICLE IMAGING UNIT

CROSS-REFERENCE TO RELATED APPLICATION

Priority is claimed on Japanese Patent Application No. 2018-159708, filed on Aug. 28, 2018, the contents of which are incorporated herein by reference.

BACKGROUND

Field of the Invention

The present invention relates to a vehicle imaging unit that includes an imaging apparatus which images a side rear direction of a vehicle.

Background

A technique in which an imaging unit (camera) having an imaging apparatus that images a side rear direction of a vehicle and a monitor that displays an image which is captured by the imaging apparatus are integrated as a monitor unit, and the integrated monitor unit is attached to a triangular window portion at a front part of a front side door is known (refer to Published Japanese Translation No. 2013-520363 of the PCT International Publication).

In the monitor unit described in Published Japanese Translation No. 2013-520363 of the PCT International Publication, in a state where the monitor unit is attached to the triangular window portion of the front side door, the monitor is arranged in a vehicle room, and the imaging unit is arranged outside the vehicle room. An imaging lens of the imaging unit is provided on a rear surface of a housing such that an optical axis of the imaging lens is directed to the side rear direction of the vehicle.

SUMMARY

In the monitor unit described in Published Japanese Translation No. 2013-520363 of the PCT International Publication, only the imaging apparatus that images the side rear direction of the vehicle is accommodated in the imaging unit that is arranged outside the vehicle. Currently, assembling not only the imaging apparatus that images the side rear direction of the vehicle but also a lamp body unit such as a turn light in the housing of the imaging unit is being considered. In this case, it is desirable for the imaging unit to be formed such that the imaging apparatus is further separated from a vehicle body of the vehicle, and the vehicle body is not reflected in an image beyond necessity while protrusion of the entire unit in the vehicle body sideward direction is prevented.

An aspect of the present invention provides a vehicle imaging unit capable of reducing an amount of reflection of a vehicle body of a vehicle by an imaging apparatus while preventing protrusion of the entire unit to a vehicle body sideward direction.

A vehicle imaging unit according to an aspect of the present invention includes: an imaging apparatus that images a side rear direction of a vehicle; a housing that houses the imaging apparatus and that is attached to a side part of a vehicle body; and a lamp body unit that is attached to an outer part in a vehicle width direction of the housing and that emits light to the outside, wherein a lens arrangement part that exposes an imaging lens of the imaging apparatus to the outside is provided at an outer part in the vehicle width direction of a rear surface of the housing, and a notch part at which the lamp body unit is arranged is provided on an outer wall in the vehicle width direction of the housing.

According to the configuration described above, when the lamp body unit is inserted into and arranged at the notch part of the housing, a separation width in the vehicle width direction between the imaging apparatus and the lamp body unit inside the housing is narrowed. Therefore, it is possible to arrange the imaging lens at a further outer position in the vehicle width direction without increasing a protrusion amount in a vehicle body sideward direction of the entire unit.

A maximum protrusion part on an outer side in the vehicle width direction of the housing may be arranged at a further outer position in the vehicle width direction than the lamp body unit.

In this case, when the vehicle is pulled over or the like, even if the vehicle imaging unit approaches another object, the maximum protrusion part of the housing easily comes into contact with the other object before the lamp body unit comes into contact with the other object. Therefore, it is possible to prevent the lamp body unit from being damaged.

The lamp body unit may be arranged at a position that is displaced upward or downward from the maximum protrusion part.

In this case, by arranging the lamp body unit to be displaced upward or downward from the maximum protrusion part of the housing, it is possible to prevent the lamp body unit from coming into contact with another object when the vehicle is pulled over or the like, and moreover, it is also possible to ensure the visibility of the lamp body unit. Specifically, in a case where the outer part in the vehicle width direction of the housing has a protruding shape having roundness at upper and lower parts, it is possible to prevent the lamp body unit from being damaged without causing degradation of the design property of the exterior appearance.

A lens hood that covers a circumferential area of the imaging lens may be provided on the lens arrangement part, the lens hood may have a hood wall that extends obliquely outward in a radial direction from the circumferential area of the imaging lens in an imaging direction, an inclination angle of the hood wall relative to an optical axis of the imaging lens may be set to differ between an outer area having the notch part and an inner area on a side opposite to the outer area, the optical axis being interposed between the outer area and the inner area, and the inclination angle of the outer area may be set to be equal to or greater than a field angle of the imaging lens and to be smaller than the inclination angle of the inner area.

In this case, by setting the inclination angle of the outer area having the notch part of the hood wall to be small in a range where the field angle is not narrowed, it is possible to arrange the imaging lens in a further outer region in the vehicle width direction of the housing. Further, the inclination angle of the inner area of the hood wall is set to be larger relative to the inclination angle of the outer area having the notch part, and therefore it is possible to ensure a space in which a finger can be inserted at a rearward side of the hood wall. Therefore, even when foreign substances such as dust, snow, or water droplets adhere to the imaging lens, it is possible to easily remove the foreign substances by inserting a finger into the hood wall.

The inclination angle of the hood wall relative to the optical axis may be set such that widths in a radiation direction of the outer region and the inner region of the hood wall are viewed to be the same width when seen from a rearward direction of the housing.

In this case, when the housing is seen from the rearward direction, the hood wall in the circumferential area of the imaging lens is viewed to have a uniform width, and therefore the appearance design property is enhanced.

According to an aspect of the present invention, the notch part at which the lamp body unit is arranged is provided on the outer wall in the vehicle width direction of the housing, and therefore it is possible to narrow the separation width in the vehicle width direction between the imaging apparatus and the lamp body unit inside the housing. Therefore, according to an aspect of the present invention, since it is possible to arrange the imaging apparatus at a further outer position in the vehicle width direction without enlarging the width in the vehicle width direction of the entire imaging unit, it is possible to reduce the amount of reflection of the vehicle body of the vehicle by the imaging apparatus while preventing protrusion of the entire imaging unit in the vehicle body sideward direction.

DESCRIPTION OF EMBODIMENTS

Figure 1:
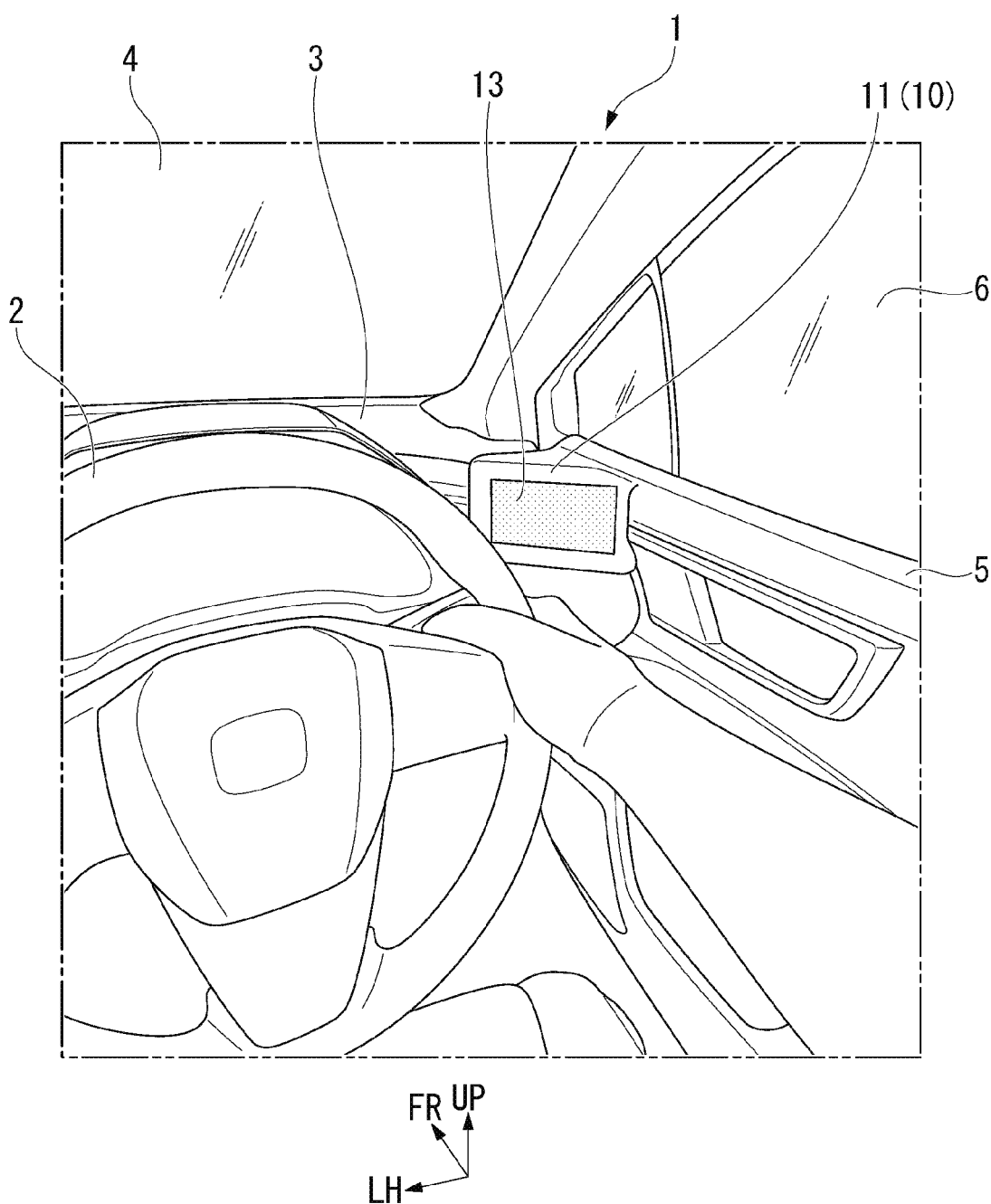
FIG. 1 is a perspective view showing a vehicle room inside of a vehicle according to an embodiment of the present invention.

Hereinafter, an embodiment of the present invention will be described with reference to the drawings. In the following description, it is assumed that frontward, rearward, upward, downward, rightward and leftward mean frontward, rearward, upward, downward, rightward, and leftward with respect to a vehicle unless otherwise specified. An arrow UP that indicates an upward direction of the vehicle, an arrow FR that indicates a frontward direction of the vehicle, and an arrow LH that indicates a leftward direction of the vehicle are shown at an appropriate position in the drawings.

FIG. 1 is a view showing a vehicle room inside of a vehicle 1 of an embodiment. FIG. 1 is a view of a frontward direction of front seats (a driver seat and a passenger seat) of the vehicle seen from an obliquely rearward upward direction.

In FIG. 1, a steering wheel 2 that is arranged in front of the driver seat (not shown), an instrument panel 3, a windshield glass 4 at a vehicle room frontward position, and a front side door (side door) 5 on the driver seat side are shown. A door glass 6 is provided on the front side door 5 to be movable upward and downward. The vehicle 1 of the present embodiment is equipped with a rearward display system 10 that displays the side rear direction of the vehicle inside the vehicle room. The rearward display system 10 captures an image in right and left rear directions of the vehicle using rearward imaging apparatuses 15 (imaging apparatuses, refer to FIG. 7 and the like) and displays the captured image on monitors 11 (display apparatus) inside the vehicle room.

The rearward display system 10 includes the rearward imaging apparatuses 15 that are arranged on an outer side of each of right and left front side doors 5, a pair of monitors 11 provided in the vehicle room and corresponding to the right and left rearward imaging apparatuses 15, respectively, and a control apparatus (not shown) that controls the rearward imaging apparatuses 15 and the monitors 11. The monitors 11 that correspond to the right and left rearward imaging apparatuses 15 are provided in the vicinity of lower ends of right and left front pillars 7, respectively, in the vehicle room. An image of a leftward rearward direction of the vehicle is displayed on the monitor 11 at the lower end of the left front pillar 7. An image of a rightward rearward direction of the vehicle is displayed on the monitor 11 at the lower end of the right front pillar 7.

Figure 2:
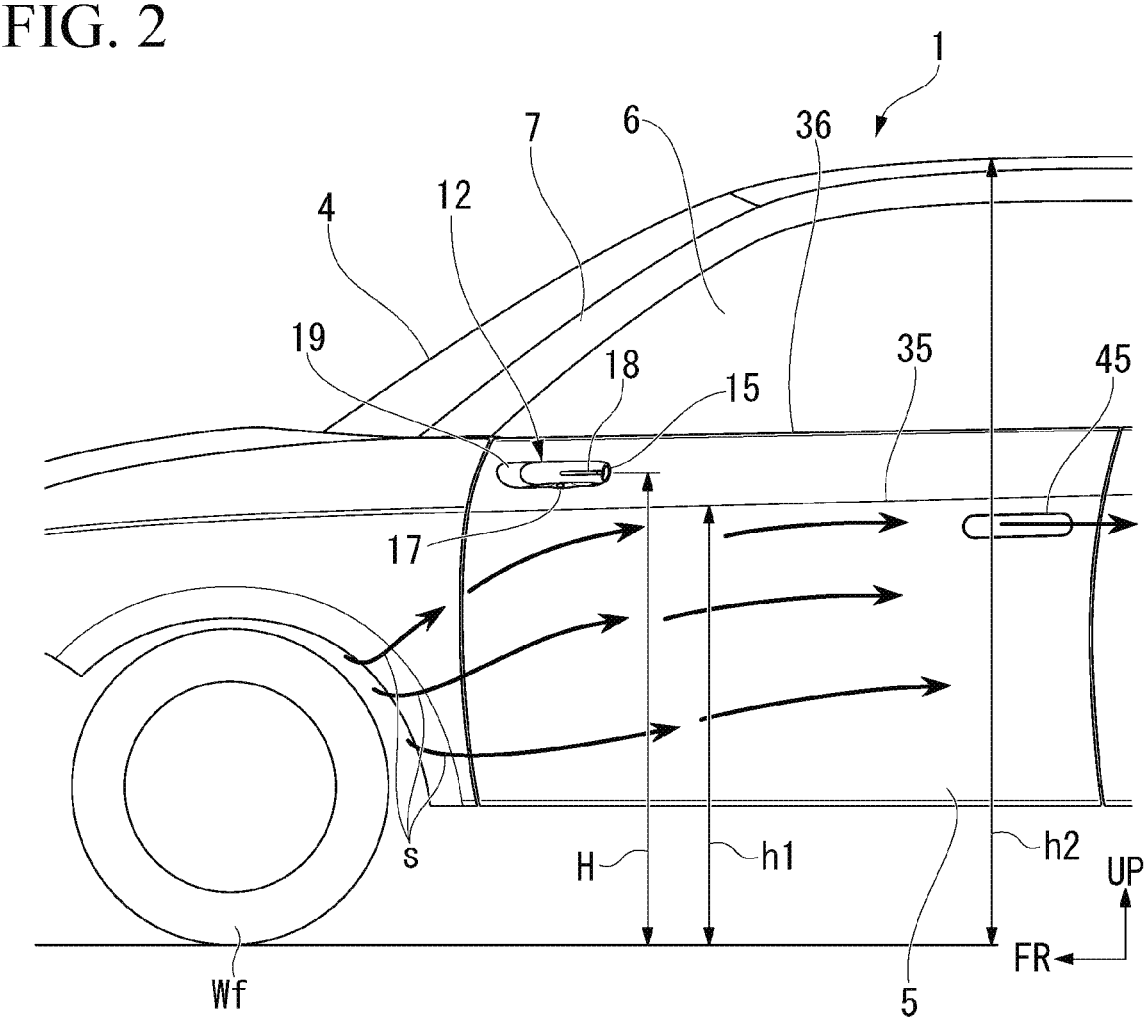
FIG. 2 is a side view of the vehicle according to the embodiment of the present invention.
Figure 3:
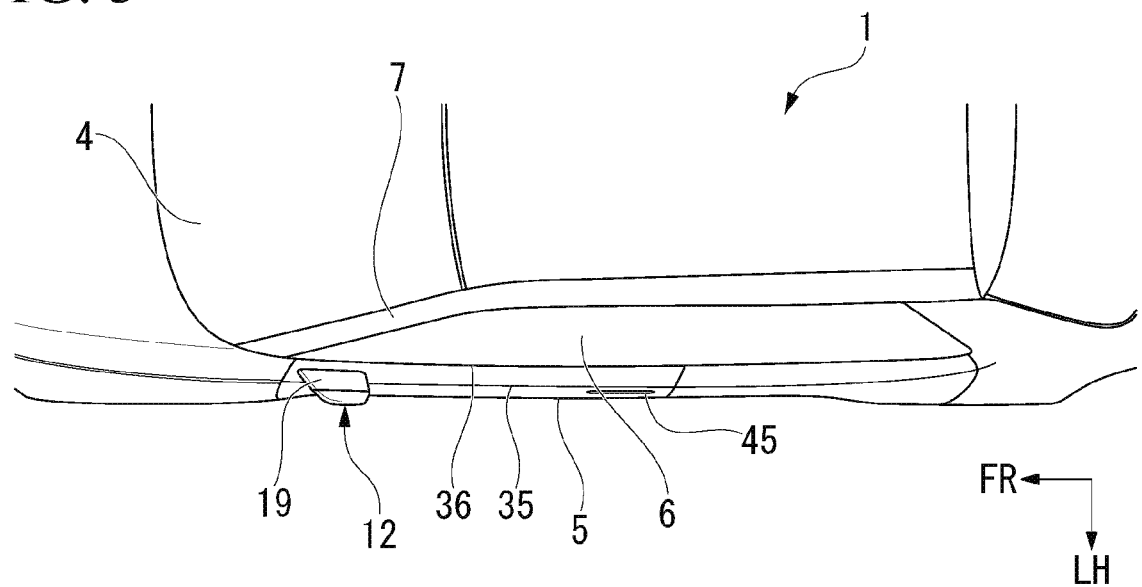
FIG. 3 is a top view of the vehicle according to the embodiment of the present invention.
Figure 4:
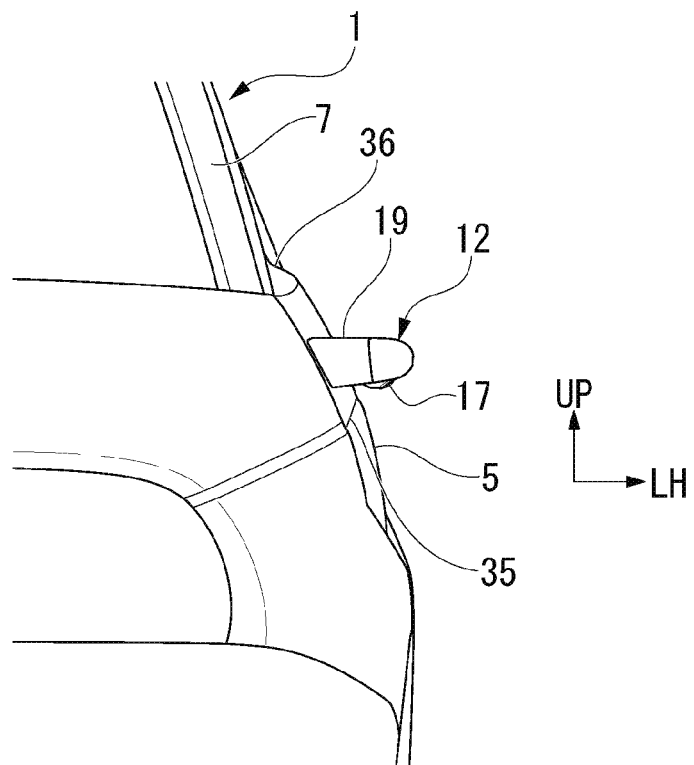
FIG. 4 is a front view of the vehicle according to the embodiment of the present invention.
Figure 5:
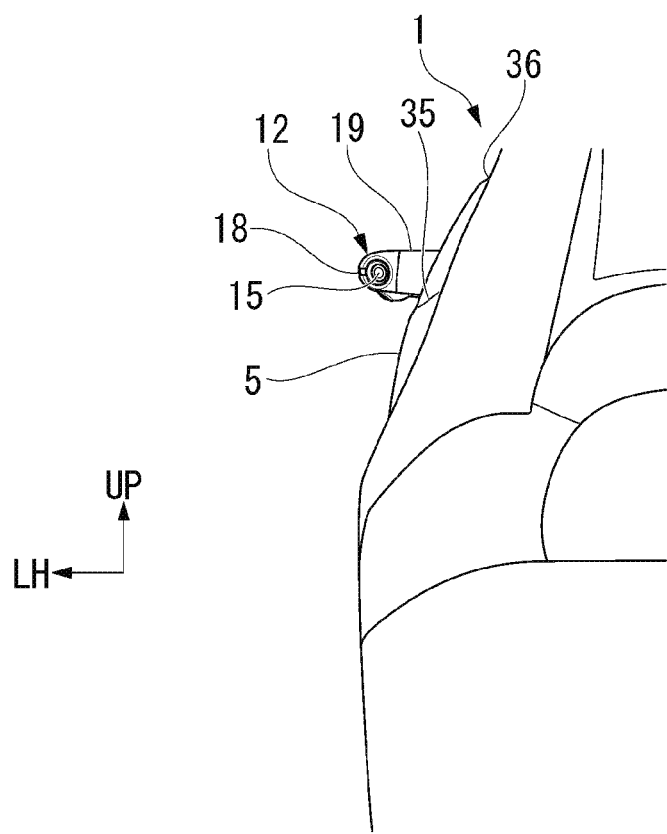
FIG. 5 is a rear view of the vehicle according to the embodiment of the present invention.

FIG. 2 is a view seen from a left side direction of the vehicle 1. FIG. 3 is a view seen from an upward direction of a left half region of the vehicle 1. FIG. 4 is a view seen from a frontward direction of the left half region of the vehicle 1. FIG. 5 is a view seen from a rearward direction of the left half region of the vehicle.

As shown in FIGS. 2 to 5, a vehicle imaging unit 12 (hereinafter referred to as an "imaging unit 12") that includes the rearward imaging apparatus 15 described above is attached to an outer side surface of the left front side door 5. An imaging unit 12 similar to the left one is also attached to an outer side surface of the right front side door 5.

Figure 6:
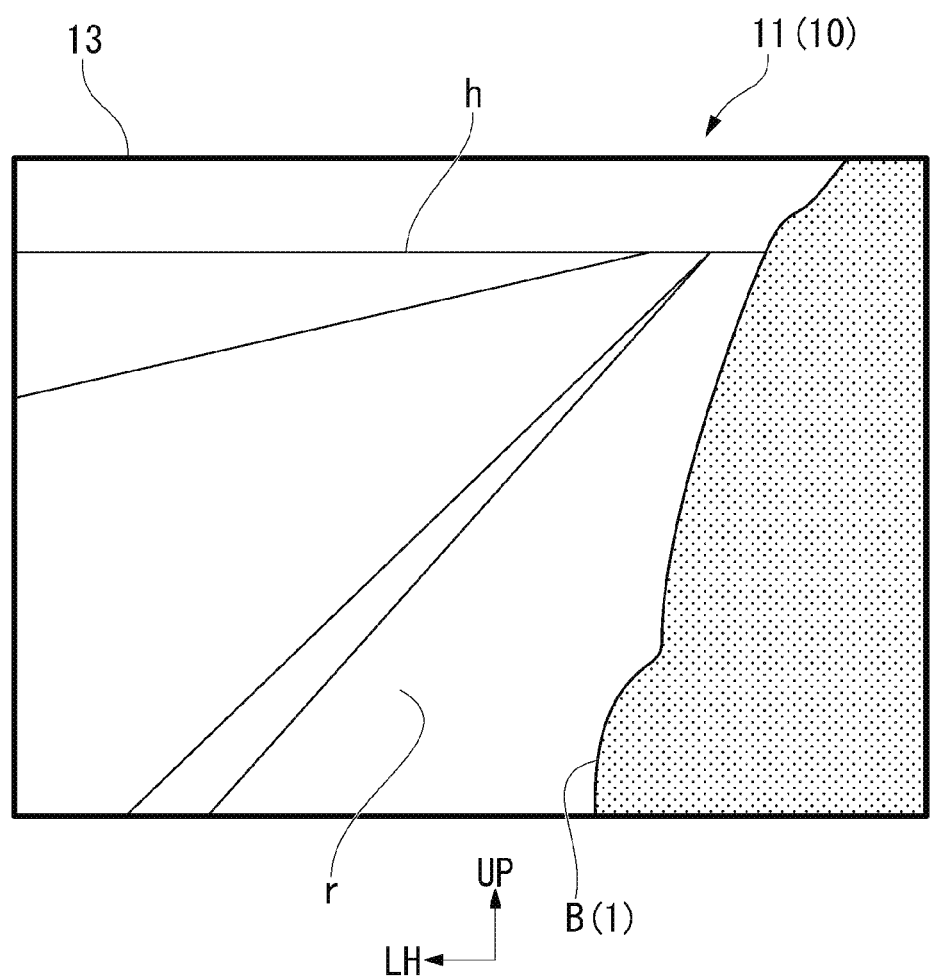
FIG. 6 is a view showing a display of a monitor of a rearward display system according to the embodiment of the present invention.

FIG. 6 is a view showing a display screen 13 of the monitor 11 that is provided in the vehicle room.

An image of the side rear direction that is captured by the rearward imaging apparatus 15 together with part of a vehicle body B at the side part of the vehicle is displayed on the display screen 13 of the monitor 11. The display screen 13 is set such that when the vehicle 1 travels on a flat road surface, a horizontal line h in the vehicle rearward direction and a predetermined distance of a road surface r in the vehicle rearward direction are simultaneously displayed on the display screen 13. An imaging target to be reflected on the display screen 13 is appropriately set in accordance with a size of the display screen 13, an arrangement height and a position in the front-to-rear direction of the rearward imaging apparatus 15, a field angle, or the like. An amount of reflection of the vehicle on the display screen 13 is set to, for example, 10% or less of the entire display screen 13.

Figure 7:
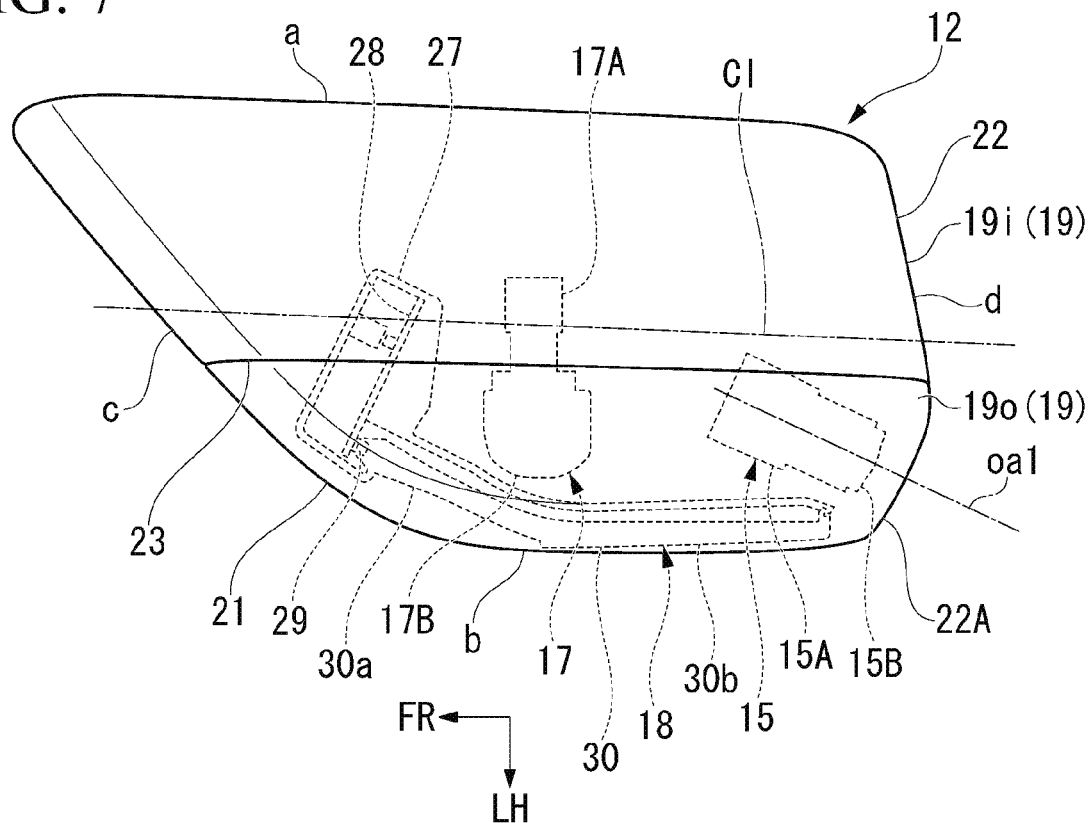
FIG. 7 is a top view of an imaging unit according to the embodiment of the present invention.
Figure 8:
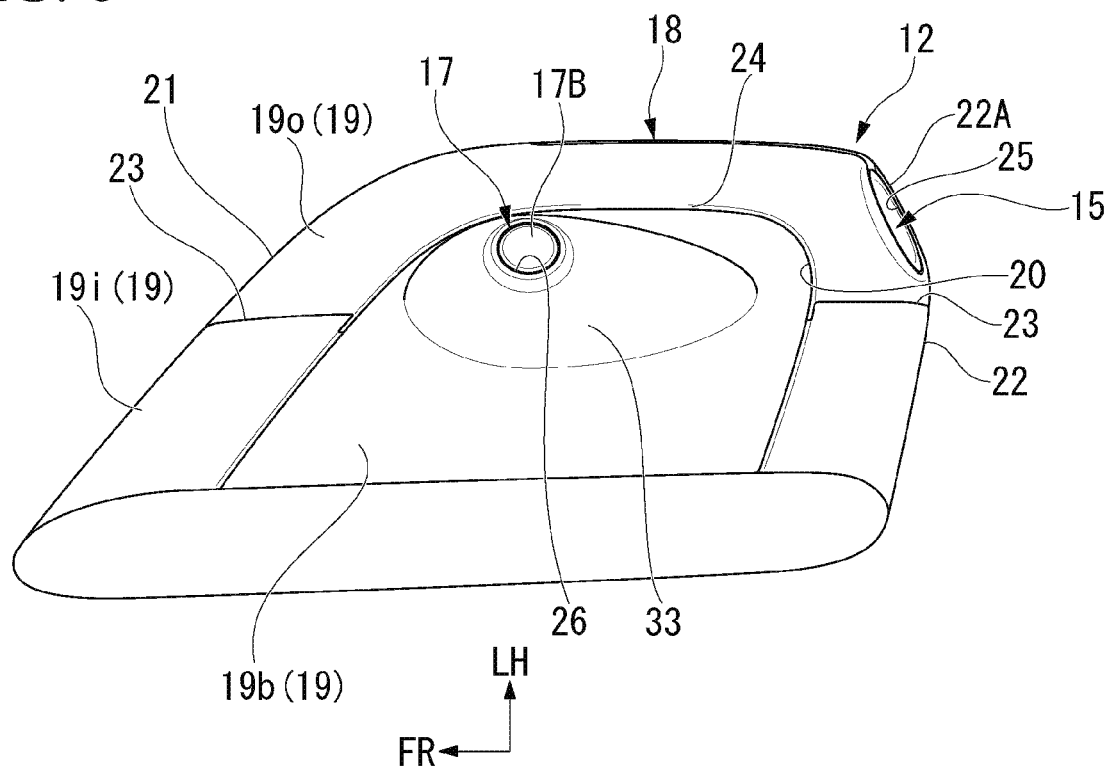
FIG. 8 is a bottom view of the imaging unit according to the embodiment of the present invention.
Figure 9:
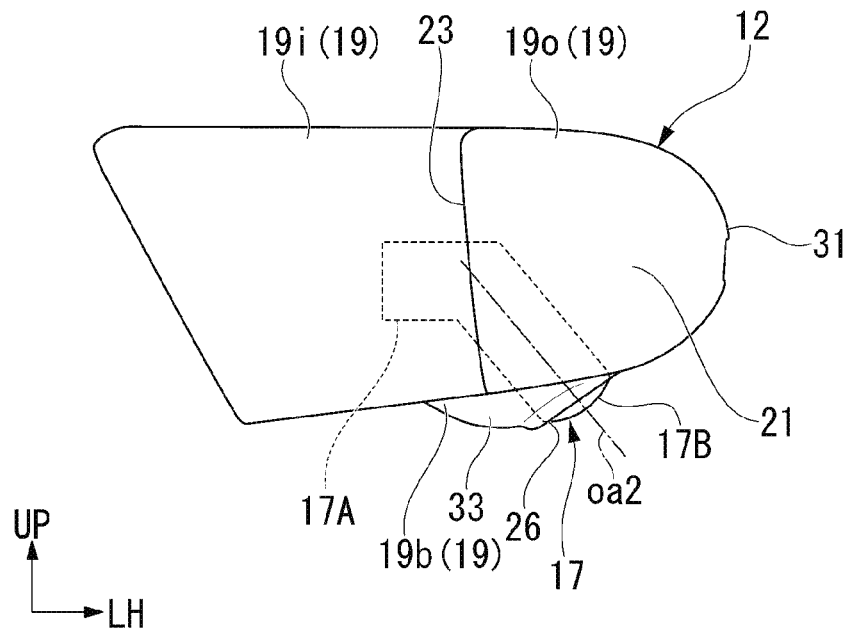
FIG. 9 is a front view of the imaging unit according to the embodiment of the present invention.
Figure 10:
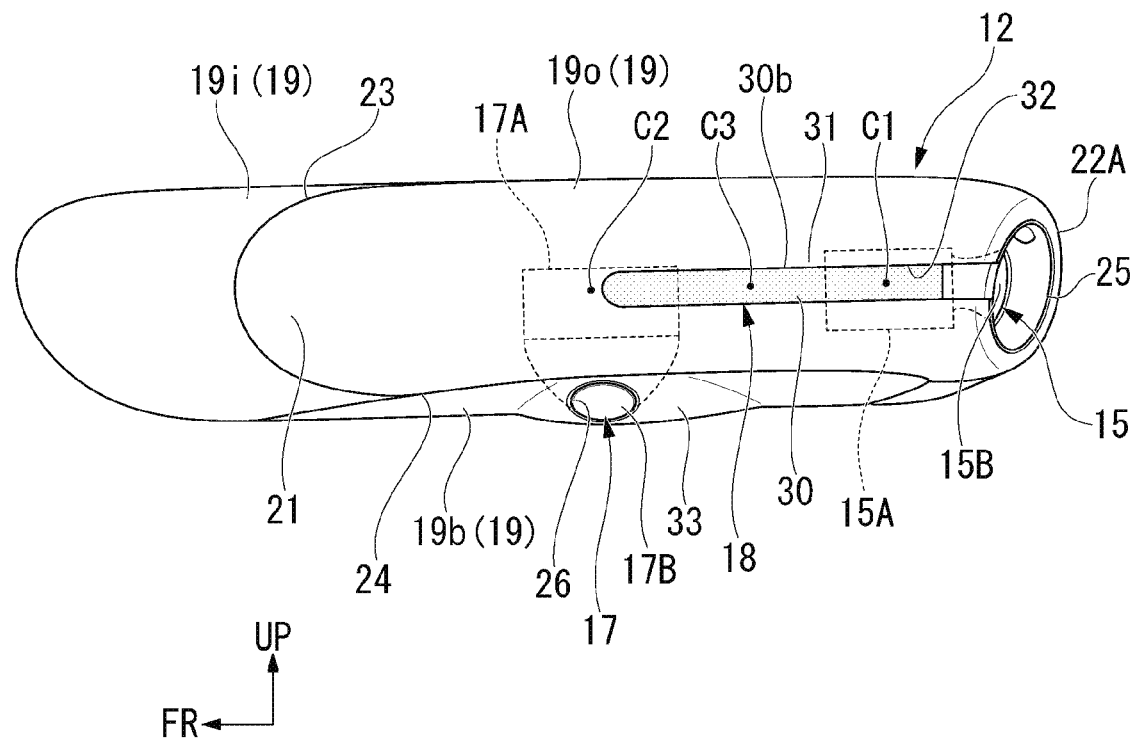
FIG. 10 is a side view of the imaging unit according to the embodiment of the present invention.
Figure 11:
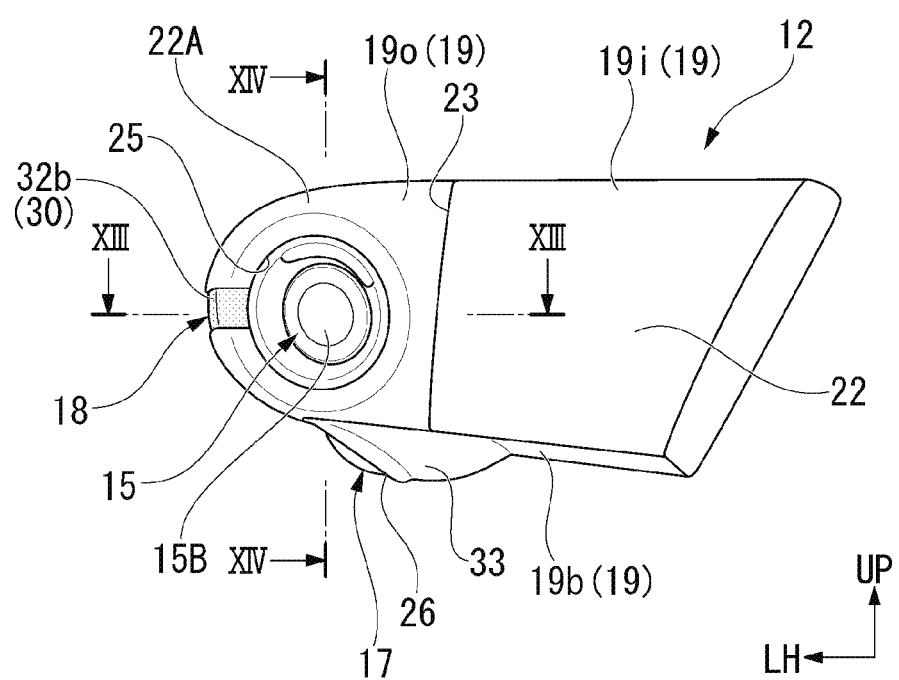
FIG. 11 is a rear view of the imaging unit according to the embodiment of the present invention.

FIG. 7 is a top view of the imaging unit 12 that is provided on the left front side door 5. FIG. 8 is a bottom view of the imaging unit 12. FIG. 9 is a front view of the imaging unit 12. FIG. 10 is a side view of the imaging unit 12. FIG. 11 is a rear view of the imaging unit 12.

As shown in FIGS. 7 to 11, the imaging unit 12 includes the rearward imaging apparatus 15 that images a side rear direction of the vehicle, a downward imaging apparatus 17 that images a side lower direction of the vehicle, a lamp body unit 18 that constitutes a turn lamp, a width indicator, and the like, and a housing 19 that houses the rearward imaging apparatus 15, the downward imaging apparatus 17, and the lamp body unit 18. The housing 19 is attached to an outer surface of the front side door 5 close to a front part of the front side door 5 via a base member (not shown).

The housing 19 includes an inner housing 19*i* that is attached to an outer surface (side part of the vehicle body) of the front side door 5, an outer housing 19*o* that is assembled to an outer side in the vehicle width direction of the inner housing 19*i*, and a bottom housing 19*b* that is assembled to an opening 20 at bottom parts of the inner housing 19*i* and the outer housing 19*o*. The inner housing 19*i*, the outer housing 19*o*, and the bottom housing 19*b* are detachably assembled together by screw fastening, clip fastening, male and female fitting, or the like. The inner housing 19*i*, the outer housing 19*o*, and the bottom housing 19*b* are formed of, for example, a hard plastic material.

As shown in FIG. 7, the housing 19 is formed in a substantially trapezoidal shape in a top view in which a width of an outer side b on the outer side in the vehicle width direction is narrower than that of an inner side a on the inner side in the vehicle width direction that is attached to the front side door 5. A front end part of the inner side a and a front end part of the outer side b are connected by an inclined side c. The inclined side c is inclined outward in the vehicle width direction from the front end part of the inner side a toward the rear side. The inclined side c and the outer side b are connected by a smooth curve. The inclined side c and a part that corresponds to the curved part which connects the inclined side c and the outer side b in the outer surface of the housing 19 are referred to as an inclined region 21 of the housing 19. A part that corresponds to a side d which connects rear end parts of the inner side a and the outer side b together in the outer surface of the housing 19 is referred to as a rear end region 22 of the housing 19.

As shown in FIG. 7, a segmentation boundary part 23 between the inner housing 19*i* and the outer housing 19*o* is arranged on an upper surface side of the housing 19. The segmentation boundary part 23 on the upper surface side of the housing 19 extends straight substantially in the vehicle front-to-rear direction. The segmentation boundary part 23 on the upper surface side of the housing 19 is arranged at a position that is deviated outward in the vehicle width direction from a middle (center line c1 in FIG. 7) in the vehicle width direction of the housing. In the outer surface of the housing 19, the inner and outer sides in the vehicle width direction between which the segmentation boundary part 23 is interposed are set to have different colors from each other. The outer surface of the inner housing 19*i* and the outer surface of the outer housing 19*o* are constituted of a smoothly continuous surface so that the segmentation boundary part 23 is interposed therebetween.

The segmentation boundary part 23 between the inner housing 19*i* and the outer housing 19*o* extends toward a lower surface side across the front and rear end parts of the inner housing 19*i* and the outer housing 19*o*. As shown in FIG. 8, the opening 20 described above is formed on the lower surface of the outer housing 19*o* such that the opening 20 extends outward in the vehicle width direction beyond the segmentation boundary part 23. A part of the outer housing 19*o* where the opening 20 extends outward in the vehicle width direction is a segmentation boundary part 24 between the bottom housing 19*b* and the outer housing 19*o*. The bottom housing 19*b* is detachably assembled to and across both lower walls of the inner housing 19*i* and the outer housing 19*o*.

The rearward imaging apparatus 15 includes an apparatus main body 15A that includes an image sensor and a variety of processing circuits and an imaging lens 15B that captures an image of an imaging target. The rearward imaging apparatus 15 is arranged at an outer portion in the vehicle width direction of a rear part in the housing 19. The imaging lens 15B is exposed to the outside of the vehicle body at an outer part in the vehicle width direction of the rear end region 22 of the housing 19. A rearward inclined surface 22A that is directed in the side rear direction of the vehicle is provided on an outer part in the vehicle width direction of the rear end region 22 of the housing 19 (outer housing 19*o*). A first lens exposure hole 25 (lens arrangement part) for exposing the imaging lens 15B to the outside is provided on the rearward inclined surface 22A. As shown in FIG. 7, an optical axis oa1 of the imaging lens 15B faces the vehicle rearward direction in a state in which the optical axis oa1 is slightly inclined outward in the vehicle width direction.

The downward imaging apparatus 17 is used for a blind monitor system or the like that displays the side lower direction of the vehicle, which becomes a blind spot from the driver seat, on a monitor (not shown) on the driver seat side. The downward imaging apparatus 17 includes an apparatus main body 17A that includes an image sensor and a variety of processing circuits and an imaging lens 17B that captures an image of an imaging target. The imaging lens 17B is exposed to the outside of the vehicle body at a lower surface in a middle region in the vehicle front-to-rear direction of the housing 19. A second lens exposure hole 26 for exposing the imaging lens 17B to the outside is provided on a lower surface of the bottom housing 19*b*. As shown in FIG. 9, an optical axis oa2 of the imaging lens 17B faces the vehicle downward direction in a state in which the optical axis oa2 is slightly inclined outward in the vehicle width direction.

As shown in FIG. 7, the rearward imaging apparatus 15 is arranged at a further rearward position of the vehicle than the downward imaging apparatus 17 when the housing 19 is seen from above and is arranged inside the housing 19 such that an outer end in the vehicle width direction of the imaging lens 15B is arranged at an outer position in the vehicle width direction than the downward imaging apparatus 17. As shown in FIG. 10, the rearward imaging apparatus 15 and the downward imaging apparatus 17 are arranged in the housing 19 such that a position of a center c1 of the apparatus main body 15A of the rearward imaging apparatus 15 and a position of a center c2 of the apparatus main body 17A of the downward imaging apparatus 17 are substantially horizontal in a state where the housing 19 is attached to a side part of the front side door 5.

As shown in FIG. 7, the lamp body unit 18 includes a base block 27 that is attached to an inner part of the housing 19, a circuit board 28 that is held by the base block 27, a lamp body 29 such as an LED that is mounted on the circuit board 28, and an elongated light guide body 30 that is held by the base block 27 and that guides the light of the lamp body 29 to a predetermined region of the outer surface of the housing 19. The light guide body 30 includes an inclined part 30*a* that extends obliquely outward in the vehicle width direction from the base block 27 toward the vehicle body rearward direction and a light irradiation part 30*b* that extends linearly from a rear end portion of the inclined part 30*a* in the vehicle rearward direction.

Figure 12:
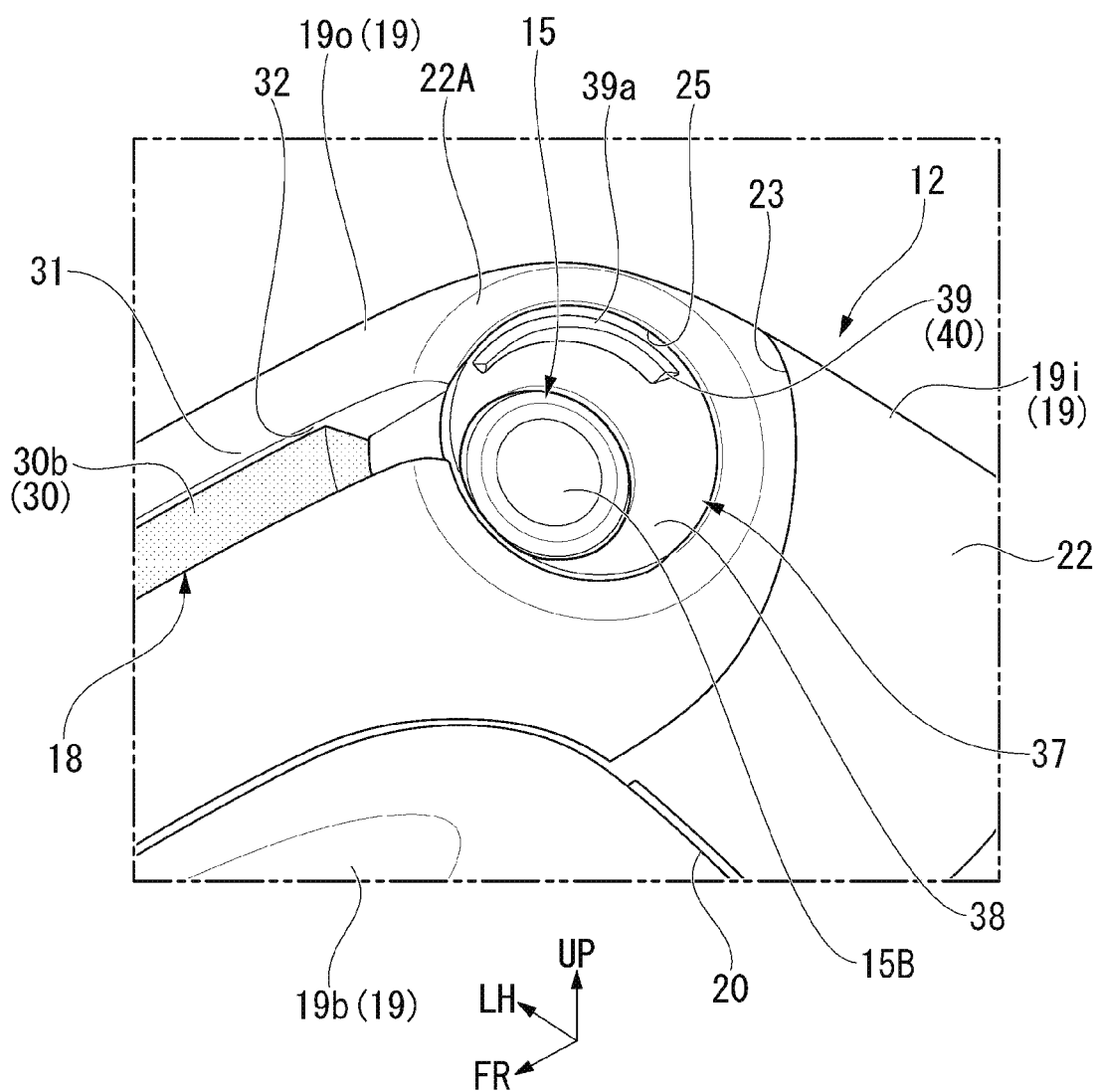
FIG. 12 is a perspective view of the imaging unit according to the embodiment of the present invention.
Figure 13:
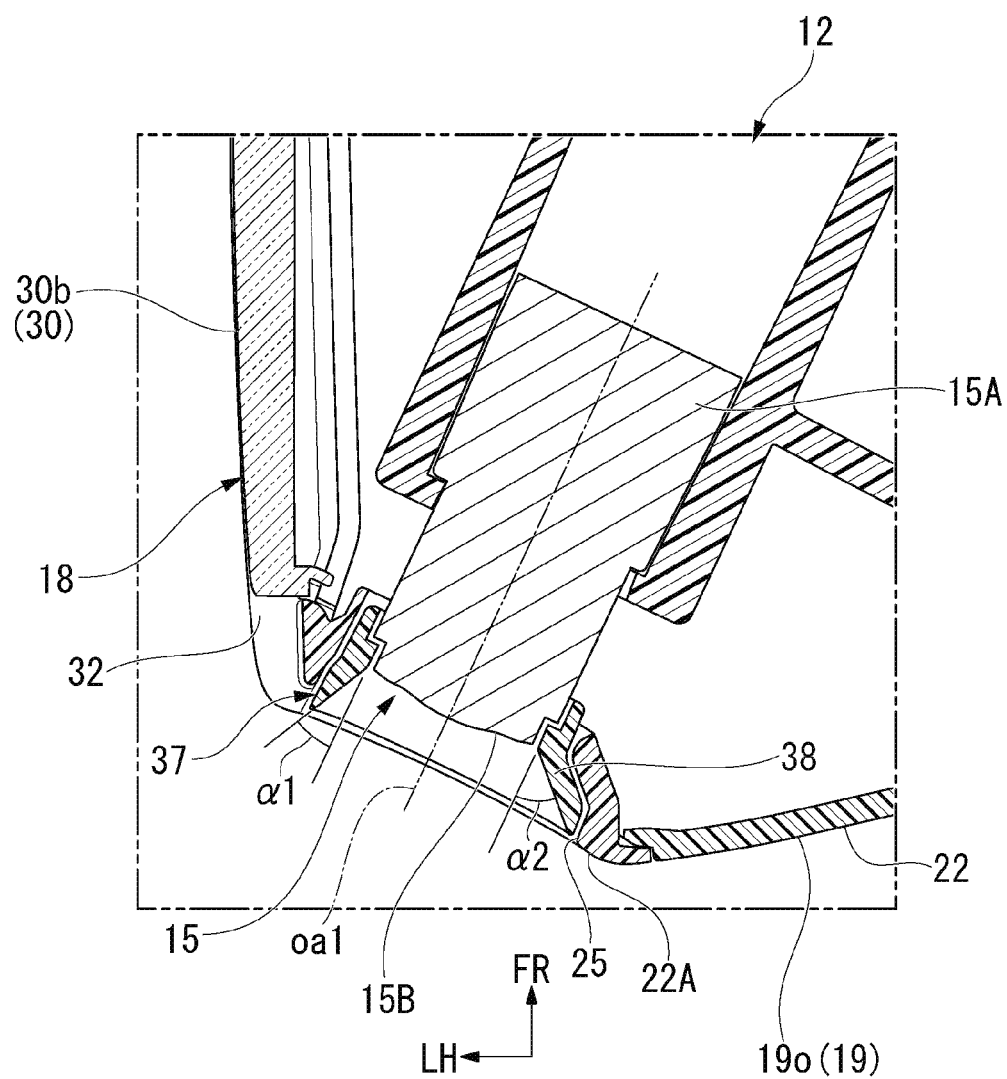
FIG. 13 is a cross-sectional view along a XIII-XIII line of FIG. 11 of the imaging unit according to the embodiment of the present invention.

FIG. 12 is a view of the rear end region 22 of the imaging unit 12 when seen from a lower direction on the outside in the vehicle width direction. FIG. 13 is view showing a cross-section along a XIII-XIII line of FIG. 11.

An outer side surface in the vehicle width direction of the housing 19 is formed of an arc surface that is curved in the vertical direction. On the outer side surface in the vehicle width direction, a groove 32 (notch part) having a substantially rectangular cross-section is formed substantially in the vehicle body front-to-rear direction at a position slightly lower than a maximum protrusion part 31 that protrudes outward in the vehicle width direction. The light irradiation part 30*b* of the light guide body 30 of the lamp body unit 18 is arranged on the groove 32 of the housing 19. A rear end portion of the light irradiation part 30*b* of the light guide body 30 is arranged in front of a position that faces the rearward inclined surface 22A in the groove 32 of the housing 19. That is, the light irradiation part 30*b* is not arranged in the vicinity of the rear end part of the groove 32 of the housing 19. Thereby, it is possible to prevent the light that is emitted from the light irradiation part 30*b* from being incident on the imaging lens 15B of the rearward imaging apparatus 15 in advance.

The rear end part of the groove 32 of the housing 19 may be closed by a member having no light transparency.

On the other hand, the inclined part 30*a* of the light guide body 30 of the lamp body unit 18, the base block 27, the circuit board 28, the lamp body 29, and the like are arranged inside the housing 19. The inclined part 30*a* of the light guide body 30 is arranged substantially along the inclined region 21 of the outer surface of the housing 19. In the housing 19, the downward imaging apparatus 17 is arranged at an inner portion in the vehicle width direction of the inclined part 30*a* of the light guide body 30. The imaging lens 17B of the downward imaging apparatus 17 is inclined obliquely downward from the apparatus main body 17A toward the outside in the vehicle width direction. A part of the imaging lens 17B that is inclined obliquely downward is arranged at an inner portion in the vehicle width direction of the inclined part 30*a* of the light guide body 30. As shown in FIG. 10, the lamp body unit 18 is arranged in the housing 19 such that a center c3 in the vertical direction of the lamp body unit 18 is substantially horizontal to the position of the center c1 of the apparatus main body 15A of the rearward imaging apparatus 15 and the position of the center c2 of the apparatus main body 17A of the downward imaging apparatus 17 in a state where the housing 19 is attached to the side part of the front side door 5.

A protrusion part 33 that protrudes downward is provided in an outer region in the vehicle width direction of the bottom housing 19*b*. The protrusion part 33 is formed in a spindle shape that is elongated in the vehicle front-to-rear direction. The second lens exposure hole 26 for exposing the imaging lens 17B of the downward imaging apparatus 17 in the downward direction of the bottom housing 19*b* is formed on the protrusion part 33. In the protrusion part 33, the second lens exposure hole 26 is arranged in a region wider than a width in the vehicle width direction of the second lens exposure hole 26, for example, in a region twice as wide as the second lens exposure hole 26 in the vehicle width direction or more. The protrusion part 33 has a region that extends further in a rearward direction of the vehicle than the second lens exposure hole 26 (imaging lens 17B).

The imaging lens 17B of the downward imaging apparatus 17 is arranged such that an outer surface of the imaging lens 17B is continuous with a surface shape of the protrusion part 33 of the bottom housing 19*b*. The rear end portion of the protrusion part 33 that converges in a spindle shape is arranged at a position that overlaps part of the imaging lens 15B of the rearward imaging apparatus 15 in the vehicle width direction.

Figure 14:
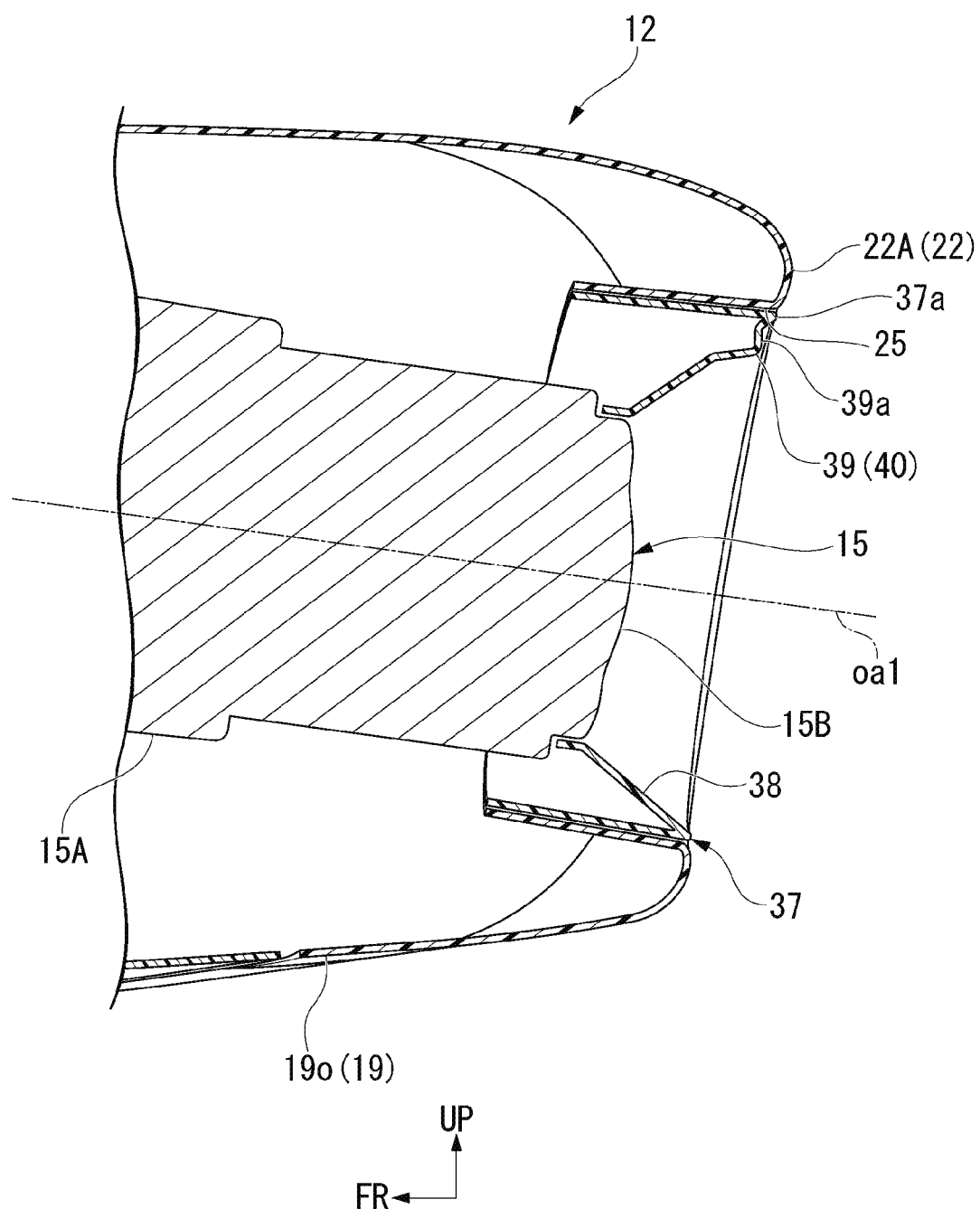
FIG. 14 is a cross-sectional view along a XIV-XIV line of FIG. 11 of the imaging unit according to the embodiment of the present invention.

FIG. 14 is a view showing a cross-section along a XIV-XIV line of FIG. 11.

As shown in FIGS. 12 to 14, a lens hood 37 that covers a circumferential area of the imaging lens 15B of the rearward imaging apparatus 15 is attached to the first lens exposure hole 25 at a rear end of the housing 19 (outer housing 19*o*). The lens hood 37 has a hood wall 38 that has a truncated conical shape and that extends obliquely outward in a radial direction from the circumferential area of the imaging lens 15B toward the imaging direction. An inclination angle of the hood wall 38 relative to the optical axis oa1 of the imaging lens 15B is set to differ between an outer area having the groove 32 (notch part) of the housing 19 and an inner area on a side opposite to the outer area, the optical axis oa1 being interposed between the outer area and the inner area.

Specifically, as shown in FIG. 13, an inclination angle α1 of the outer area is set to be equal to or greater than a field angle of the imaging lens 15B and to be smaller than an inclination angle α2 of the inner area. In a circumferential direction of the hood wall 38, an angular difference between the inclination angle α1 of the inner area and the inclination angle α2 of the outer area is the largest, and the inclination angle changes continuously between the inner area and the outer area. The inclination angle of the hood wall 38 relative to the optical axis oa1 is set such that widths in the radial direction of the outer area and the inner area of the hood wall 38 are viewed to be the same width when the housing 19 is seen from the rearward direction.

As shown in FIG. 12 and FIG. 14, a step part 39 having a substantially vertical surface 39*a* that is directed in the imaging direction is formed in an upper region of the imaging lens 15B in the hood wall 38 of the lens hood 37 when seen from a direction of the optical axis oa1 of the imaging lens 15B. The step part 39 is formed of a protrusion 40 that protrudes in the imaging direction with respect to an inclined surface of the hood wall 38. The protrusion 40 is formed in an arc shape substantially along an outer circumferential edge part of the hood wall 38 when seen from the direction of the optical axis oa1.

The protrusion 40 can also be formed in an annular shape when seen from the direction of the optical axis oa1.

The protrusion 40 (step part 39) is formed to be recessed frontward from an outer circumferential end part 37*a* (end part in an imaging target direction) of the lens hood 37.

The imaging unit 12 of the present embodiment is arranged at a height equal to or less than that of the side part of the vehicle 1.

Hereinafter, this will be described with reference to FIG. 2. In FIG. 2, a door waist part 36 and a character line 35 at a vehicle body side part are shown. The character line 35 is a convex ridge line part that is provided to protrude on the outer surface of the vehicle body side part that includes the front side door 5 and extends substantially in the vehicle front-to-rear direction. The door waist part 36 is an upper side part of a door main body of the front side door 5 and constitutes a lower side in appearance of a window frame part in which the door glass 6 moves upward and downward.

The imaging unit 12 is arranged above a height h1 of the character line 35 of the front side door 5 and in a height range from 925 mm from a ground surface to a maximum vehicle height h2. Therefore, as shown in FIG. 2, spray s that is scattered by a front wheel Wf of the vehicle when the vehicle travels is blocked by a raised part of the character line 35 and does not easily adhere to the imaging unit 12.

In the case of the present embodiment, since an installation height of the imaging unit 12 is set to 925 mm or more from the ground surface, halation due to the light of a headlight of a following vehicle is less likely to occur. That is, in the present embodiment, since the imaging unit 12 is arranged at the height of 950 mm which is a maximum installation height of the headlight of a general vehicle that is used on a public road and at the height of 925 mm or more in consideration of a downward inclination of an optical axis of the headlight, it is possible to prevent occurrence of halation in the image of the monitor 11 when the light of the headlight of the following vehicle directly enters the rearward imaging apparatus 15.

In the case of the present embodiment, the imaging unit 12 is arranged at a lower position than the door waist part 36 of the front side door 5. Therefore, it becomes difficult for the imaging unit 12 to enter the driver's view through the window frame part of the front side door 5.

As shown in FIG. 2, a retractable flash door handle 45 is provided on a rear edge part of the outer surface of the front side door 5. The flash door handle 45 is formed in a horizontally elongated rectangular shape in a side view of the vehicle. The imaging unit 12 that is attached to a front edge part of the outer surface of the front side door 5 is formed in a horizontally elongated rectangular shape having the same size and substantially the same shape as those of the flash door handle 45 in a side view of the vehicle. The imaging unit 12 and the flash door handle 45 are arranged at point-symmetrical positions with respect to a centering point on the character line 35 in a side view of the vehicle.

As described above, in the imaging unit 12 of the present embodiment, the groove 32 at which the lamp body unit 18 is arranged is provided on the outer wall in the vehicle width direction of the housing 19, and therefore it is possible to narrow the separation width in the vehicle width direction between the rearward imaging apparatus 15 and the lamp body unit 18 inside the housing 19. Therefore, it is possible to arrange the rearward imaging apparatus 15 at a further outer position in the vehicle width direction without enlarging the protrusion width in the vehicle width direction of the entire imaging unit 12. Accordingly, when the imaging unit 12 of the present embodiment is employed, it is possible to reduce the amount of reflection of the vehicle body of the vehicle by the rearward imaging apparatus 15 while preventing protrusion of the entire unit in the vehicle body sideward direction.

Further, in the imaging unit 12 of the present embodiment, the maximum protrusion part 31 on the outer side in the vehicle width direction of the housing 19 is arranged at a further outer position in the vehicle width direction than the lamp body unit 18. Therefore, when the vehicle is pulled over or the like, even when the imaging unit 12 approaches another object, the maximum protrusion part 31 of the housing 19 easily comes into contact with the other object before the lamp body unit 18 comes into contact with the other object. Accordingly, when the configuration of the present embodiment is employed, it is possible to prevent the lamp body unit 18 from being damaged.

Specifically, in the present embodiment, since the lamp body unit 18 is arranged at a position that is displaced slightly downward from the maximum protrusion part 31 having an arc shape of the housing 19, it is possible to easily prevent the lamp body unit 18 from coming into contact with another object when the vehicle is pulled over or the like, and moreover, it is also possible to ensure the visibility of the lamp body unit 18. In a case where the outer part in the vehicle width direction of the housing 19 has a protruding shape having roundness at upper and lower parts as in the present embodiment, it is possible to prevent the lamp body unit 18 from being damaged without causing degradation of the appearance design property.

Further, the imaging unit 12 of the present embodiment includes the lens hood 37 that covers the circumferential area of the imaging lens 15B of the rearward imaging apparatus 15, and the inclination angle of the hood wall 38 of the lens hood 37 relative to the optical axis oa1 is set to differ between the outer area having the groove 32 of the housing 19 and the inner area on the side opposite to the outer area. The inclination angle α1 of the outer area of the hood wall 38 is set to be equal to or more than the field angle of the imaging lens 15B and to be smaller than the inclination angle α2 of the inner area. Therefore, by setting the inclination angle α1 of the outer area having the groove 32 of the housing 19 in the hood wall 38 to be small in a range where the field angle is not narrowed, it is possible to arrange the imaging lens 15B of the rearward imaging apparatus 15 in a further outer region in the vehicle width direction of the housing 19.

Further, in the case of the imaging unit 12 of the present embodiment, the inclination angle α1 of the inner area of the hood wall 38 is set to be larger relative to the inclination angle α2 of the outer area having the groove 32 of the housing 19, and therefore it is possible to ensure a space having an open angle in which a finger can be inserted on a rearward side of the hood wall 38. Accordingly, even when foreign substances such as dust, snow, or water droplets adhere to the imaging lens 15B of the rearward imaging apparatus 15, it is possible to easily remove the foreign substances by inserting a finger into the hood wall 38.

Further, in the imaging unit 12 of the present embodiment, the inclination angle of the hood wall 38 relative to the optical axis oa1 is set such that widths in the radiation direction of the outer region and the inner region of the hood wall 38 are viewed to be the same width when the housing 19 is seen from the rearward direction. Therefore, when the housing 19 is seen from the rearward direction, the hood wall 38 in the circumferential area of the imaging lens 15B is viewed to have a uniform width. Accordingly, when the configuration of the present embodiment is employed, it is possible to further enhance the appearance design property from the vehicle rearward direction.

The present invention is not limited to the embodiment described above, and a variety of design changes can be made without departing from the scope of the invention. For example, in the embodiment described above, the groove 32 having a substantially rectangular cross-section is provided as the notch part at which the lamp body unit 18 is arranged on the outer wall in the vehicle width direction of the housing 19; however, the notch part is not limited to the groove and may be a hole such as a slit that penetrates through the wall of the housing 19.

What is claimed is:

1. A vehicle imaging unit, comprising:
    an imaging apparatus that images a side rear direction of a vehicle;
    a housing that houses the imaging apparatus and that is attached to a side part of a vehicle body; and a lamp body unit that is attached to an outer part in a vehicle width direction of the housing and that emits light to an outside, wherein a lens arrangement part that exposes an imaging lens of the imaging apparatus to an outside is provided at an outer part in the vehicle width direction of a rear surface of the housing, and a notch part at which the lamp body unit is arranged is provided on an outer wall in the vehicle width direction of the housing, wherein a lens hood that covers a circumferential area of the imaging lens is provided on the lens arrangement part, the lens hood has a hood wall that extends obliquely outward in a radial direction from the circumferential area of the imaging lens toward an imaging direction, an inclination angle of the hood wall relative to an optical axis of the imaging lens is set to differ between an outer area having the notch part and an inner area on a side opposite to the outer area, the optical axis being interposed between the outer area and the inner area, and the inclination angle of the outer area is set to be equal to or greater than a field angle of the imaging lens and to be smaller than the inclination angle of the inner area.

2. The vehicle imaging unit according to claim 1, wherein a maximum protrusion part on an outer side in the vehicle width direction of the housing is arranged at a further outer position in the vehicle width direction than the lamp body unit.

3. The vehicle imaging unit according to claim 2, wherein the lamp body unit is arranged at a position that is displaced upward or downward from the maximum protrusion part.

4. The vehicle imaging unit according to claim 1, wherein the inclination angle of the hood wall relative to the optical axis is set such that widths in a radiation direction of the outer region and the inner region of the hood wall are viewed to be the same width when seen from a rearward direction of the housing.

* * * * *